No. 672,454.  
N. D. NELSON.  
PASTEURIZING MACHINE.  
(Application filed Mar. 10, 1900.)  
(No Model.)  
Patented Apr. 23, 1901.

UNITED STATES PATENT OFFICE.

NELSE D. NELSON, OF ANN ARBOR, MICHIGAN.

PASTEURIZING-MACHINE.

SPECIFICATION forming part of Letters Patent No. 672,454, dated April 23, 1901.

Application filed March 10, 1900. Serial No. 8,214. (No model.)

*To all whom it may concern:*

Be it known that I, NELSE D. NELSON, a citizen of the United States, residing at Ann Arbor, in the county of Washtenaw and State of Michigan, have invented a certain new and useful Improvement in Pasteurizing-Machines, (Case No. 1,) of which the following is a full, clear, concise, and exact description, reference being had to the accompanying drawings, forming a part of this specification.

My invention relates to apparatus for pasteurizing milk and the like, so as to rid it, so far as possible, of bacteria, especially of the disease-producing variety. In apparatus of this kind the milk is pasteurized by first heating it to a temperature sufficiently high to kill the various bacteria, then retaining it at that temperature long enough to destroy substantially all of the germs, and finally chilling it down as rapidly as possible.

Prominent objects of my invention are to provide a simple, practical, and inexpensive apparatus of this kind; to reduce to a minimum the number of moving parts; to avoid all undue strain upon the apparatus; to maintain a thorough and effective circulation of both the milk and the cooling fluid during the operation; to secure an exceptionally high degree of efficiency, and to arrange for the continuous operation of the machine—that is to say, the repeated pasteurizing of successive quantities of milk without stopping or interfering with the operation of the machine.

To the attainment of the foregoing and other desired ends my invention consists in matters hereinafter fully set forth.

Figure 1:
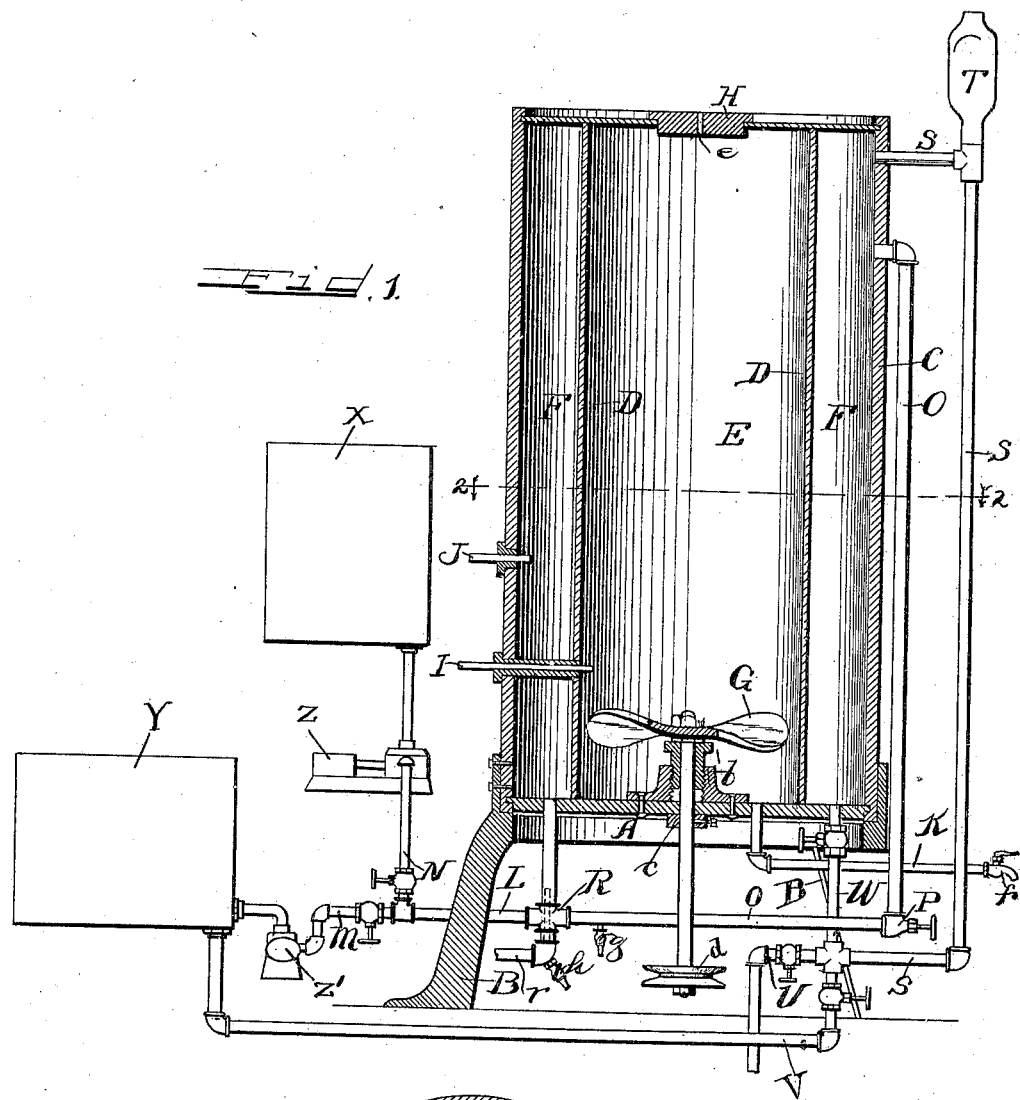
Figure 2:
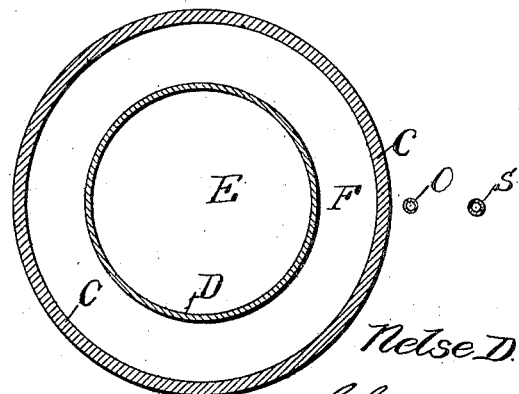

In the accompanying drawings, Figure 1 is a vertical sectional view of a pasteuring apparatus embodying my invention, together with the connections and related apparatus for the same; and Fig. 2 is a horizontal section taken on line 2 2 in Fig. 1, certain attachments being omitted for convenience of illustration.

In the apparatus shown in the drawings a suitable standard or base A is provided with legs B B. Arranged upon the base A is an exterior cylindrical casing C, which is conveniently made of wooden staves or the like, and within the casing C is arranged an interior cylindrical receptacle D, which is desirably made of metal. The fluid to be pasteurized, such as milk, is introduced within the chamber E, provided by the receptacle D, as by pouring it into an opening formed in the top of said receptacle, and provided with a cover H, having a small vent or orifice $e$. This fluid is then pasteurized—that is to say, is first heated—then retained at the elevated temperature, and finally chilled as rapidly as possible by suitable fluids introduced into the chamber F, formed between the casing C and the receptacle D.

For first heating the fluid to be pasteurized water at ordinary temperature is introduced into the chamber F through a suitable inlet-pipe L, connected to the bottom of the casing C, and is heated by a steam-jet R, arranged in said inlet-pipe L. The water thus introduced is understood to come from a suitable source of supply, such as a tank X, and to be pumped by a suitable pump Z, connected by a pipe N with the inlet-pipe L. The steam is understood to be supplied to the steam-jet R by a suitable steam-pipe $r$. The steam-jet is allowed to heat the fluid in the chamber F to an extent to raise the temperature of the fluid in the receptacle D to the proper point and to retain it at that point for the proper length of time. During this heating of the fluid to be pasteurized the fluid in the chamber F circulates through a circulation-pipe O, which extends from the inlet-pipe L under the casing C and upwardly along one side of the same and is connected near the top thereof. It will be readily seen that the upwardly-directioned force of the steam-jet, together with the tendency of the heated fluid to rise, will cause the fluid in the casing F to rise from the bottom thereof within the chamber and to flow out of the top thereof into and down the circulation-pipe O to the inlet-pipe L and thence again into the chamber F. In this way a continuous circulation of the heating and heated fluid will take place upwardly in the chamber F and downwardly in the circulation-pipe O. When the fluid contained by the receptacle D has been maintained at a high temperature for a sufficiently long time, the steam-jet R is shut off and the fluid under ordinary temperature is allowed to continue to flow into the chamber F through the inlet-pipe L. As a result the temperature of the fluid in the chamber F is rapidly reduced, the temperature of the fluid supplied by the tank X being of course considerably lower than the temperature to which this fluid was heated by the steam-jet. The valve P in the circulation-pipe O is desirably left open, so that the cooling fluid from the tank X will enter the chamber F by way of the circulating-pipe O as well as through the inlet-pipe L. As a result this fluid admitted by the pipe O, being cooler than that contained by the chamber F, will descend in the latter and then will rise as it becomes heated. The fluid admitted by the pipe L will also rise in the chamber F as it becomes heated. In this way a continuous circulation is induced, the water from the pipe O first descending and then rising and that from the pipe L also rising. The hottest fluid therefore assembles at the top of the chamber F. From here it overflows through an overflow-pipe S, which is connected near the top of the casing C and extends downwardly alongside of the same, terminating in a waste-pipe U. In this way the heated fluid within the chamber F is gradually drawn off by way of the outlet-pipe S and waste branch U as the cooling fluid is introduced into the chamber through the inlet-pipe L. This is continued until what is called an "economic temperature" is reached—that is to say, until it is not advantageous to continue the cooling means of fluid under ordinary temperature. At this point all of the fluid is withdrawn from the chamber F, as by opening the valve in a suitable valved drain-pipe W, connected with the waste-pipe U. When all of this fluid, together with that in the circulating and overflow pipes, has been thoroughly drained, another cooling fluid, preferably brine, at a very low temperature is introduced into the chamber F. As a simple arrangement this brine is introduced by way of the same inlet-pipe L through a branch or connection M, extending to a suitable source of brine-supply Y and including a suitable pump Z. The brine is allowed to enter and flow through the chamber F until the fluid in the receptacle D is cooled to a sufficient extent. The brine entering the chamber F by way of the inlet-pipe L will flow upwardly in said chamber, while that entering by way of the circulation-pipe O will flow downwardly in the chamber F and thence upwardly, as described in connection with the fluid admitted from the pipe N after the steam-jet R has been shut off. After circulating through the chamber F in this way the brine flows out of the same through the overflow-pipe S.

As it is desirable to retain the brine and use it over and over again, it is returned to the source of supply Y by means of a pipe V, connecting such a source with the overflow-pipe S.

It will be understood, of course, that the supply-pipes M and N and also the waste-pipe U and return brine-pipe V are all supplied with suitable valves by which they can be opened and closed. It will also be understood that the circulation-pipe O and the steam-pipe r are provided with suitable drain-cocks g and h, respectively.

From the foregoing it will be seen that I provide a receptacle for the fluid to be pasteurized, a chamber surrounding the same for fluid for heating and cooling such fluid to be pasteurized, means for supplying the surrounding chamber first with a heating fluid and then with two cooling fluids at different temperatures, and means for circulating both the heating fluid and both of the cooling fluids. I also arrange to continuously circulate the fluid to be pasteurized while the same is being heated and cooled. To such end I have shown a propeller-blade G arranged at the bottom of the receptacle E in such a way that when it turns it will continuously draw the contents of the receptacle downwardly and at the same time rotate them bodily within the receptacle. This produces a continuous circulation in the receptacle D downwardly in the middle and upwardly at the sides and at the same time bodily in a rotary direction. The propeller G is mounted upon a shaft $a$, which is extended through a bearing $b$, secured in the bottom of the casing C. It is provided with a pulley $d$, by which it can be rotated.

The receptacle D is provided with an outlet-pipe K, having a faucet $f$, by which the contents of the receptacle can be withdrawn.

By the foregoing arrangement it will be seen that the fluid to be pasteurized can be introduced into the receptacle D and then withdrawn after pasteurization without interfering at all with the operation of the machine. This operation can be done repeatedly, allowing the machine to be charged and recharged indefinitely without stopping it.

I have shown a couple of thermometers I and J, the former extending into the receptacle E and the latter into the chamber F, whereby the temperature of the contents of both the fluid under pasteurization and the fluid in the chamber F can be determined.

I do not wish to be limited to the precise embodiment of my invention herein shown and particularly described; but,

Having thus described my invention, I claim as new, and desire to secure by Letters Patent, the following:

1. The combination with the casing providing a chamber for the heating and cooling fluids; of a circulating system; means for supplying the casing with either a heating or a cooling medium; said means being adapted to introduce the heating fluid at or near the bottom of the casing, and to introduce the cooling fluid at or near the top thereof.

2. In a pasteurizing apparatus, the combination with the casing providing a chamber for the temperature-varying fluids; of an inlet-pipe having an inlet portion leading to the bottom of said chamber and containing a steam-jet; a circulation-pipe which extends downwardly from the upper portion of said chamber and connects with said steam-jet portion; a couple of branches to said inlet-pipe, one for connecting with the source for supplying water or the like, and the other with the source for supplying brine or the like; an overflow-pipe extending downwardly from the top of said chamber and having a waste-outlet, and also having a branch for connection with the source for supplying brine or the like; and a drain-pipe extending from the bottom of said chamber.

3. In a pasteurizing apparatus, the combination of a casing providing a chamber for the temperature-varying fluids; a circulation-pipe arranged below and upward along one side of said casing, and having its upper end connected with the upper end of said casing; a connection between the lower end of the circulation-pipe and the lower end of the casing; a steam jet in said connection; and a supply-pipe connected with said circulation-pipe; whereby the fluid can be caused to circulate out of the top of the casing and downwardly through the circulation-pipe when the steam-jet is in operation, and to flow upwardly through said pipe and then circulate first downwardly and then upwardly within the casing, when the steam-jet is not in operation.

4. In a pasteurizing apparatus, the combination of a vertically-arranged smooth-walled interior casing, and a vertically-arranged exterior casing; pipe connections for supplying fluid to the exterior casing for varying the temperature of the contents of the interior casing; and a rotary screw in the interior casing arranged to move the contents of said casing downward in the middle, and to turn or rotate the same throughout the casing.

5. A pasteurizing apparatus comprising a receptacle for the fluid to be pasteurized; a casing providing a chamber for fluids to heat and cool the contents of the receptacle; an inlet-pipe provided with a steam-jet and having branches extending to sources for supplying fluid under ordinary temperature and fluid at a low temperature; a circulation-pipe connected with said inlet-pipe, and also connected with said casing near the top thereof; a connection between said circulation-pipe and the bottom of the casing; and an overflow-pipe extending from the upper portion of the casing.

In witness whereof I hereunto subscribe my name this 6th day of March, A. D. 1900.

NELSE D. NELSON.

Witnesses:
JOHN W. BENNETT,
THOMAS S. BURR.